United States Patent
Katagishi et al.

(10) Patent No.: US 6,735,504 B2
(45) Date of Patent: May 11, 2004

(54) REPAIR AND MAINTENANCE SUPPORT SYSTEM AND A CAR CORRESPONDING TO THE SYSTEM

(75) Inventors: Makoto Katagishi, Chigasaki (JP); Yoshiro Mikami, Hitachioota (JP); Teruo Fujii, Yokohama (JP); Kenji Sano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/387,618

(22) Filed: Mar. 14, 2003

(65) Prior Publication Data

US 2003/0182034 A1 Sep. 25, 2003

Related U.S. Application Data

(63) Continuation of application No. 10/214,609, filed on Aug. 9, 2002, now Pat. No. 6,549,833, which is a continuation of application No. 09/974,832, filed on Oct. 12, 2001, now Pat. No. 6,438,471.

(30) Foreign Application Priority Data

May 8, 2001 (JP) .................................. 2001-136824

(51) Int. Cl.$^7$ ................................ G05S 5/00
(52) U.S. Cl. .................... 701/33; 701/29; 701/207; 701/213
(58) Field of Search ............... 701/29, 30, 32, 701/33, 34, 200–213; 705/13, 22, 28, 29, 413; 340/992, 993, 995, 990, 988; 342/457, 357.13

(56) References Cited

U.S. PATENT DOCUMENTS

| | | | |
|---|---|---|---|
| 5,157,610 A | 10/1992 | Asano et al. | 701/32 |
| 5,781,125 A | 7/1998 | Godau et al. | 701/33 |
| 5,850,209 A | 12/1998 | Lemke et al. | 701/33 |
| 6,055,468 A | 4/2000 | Kaman et al. | 701/29 |
| 6,330,499 B1 | 12/2001 | Chou et al. | 701/33 |
| 6,339,736 B1 | 1/2002 | Moskowitz et al. | 701/29 |

FOREIGN PATENT DOCUMENTS

| | | |
|---|---|---|
| JP | 8-293832 | 11/1996 |
| JP | 9-139709 | 5/1997 |
| JP | 9-159581 | 6/1997 |
| JP | 10-220173 | 8/1998 |
| JP | 11-7599 | 1/1999 |

*Primary Examiner*—Richard M. Camby
(74) *Attorney, Agent, or Firm*—McDermott, Will & Emery

(57) ABSTRACT

The disclosed system performs procedures to request repair, without troubling the driver, when a car breaks down. This system comprises an onboard peripheral apparatus having a failure detector, an onboard main controller for managing car information, a cellular phone which can make wireless connection to the onboard main controller, and a response center for receiving requests for car repairs and maintenance and making arrangements therefore. When a failure is detected, repair request is transmitted to the response center through wireless communication together with the user ID of the driver. Based on this request, the response center acquires remedy information from a car manufacturer and makes arrangements for repair and provides this remedy information to a repair shop.

9 Claims, 11 Drawing Sheets

FIG.8

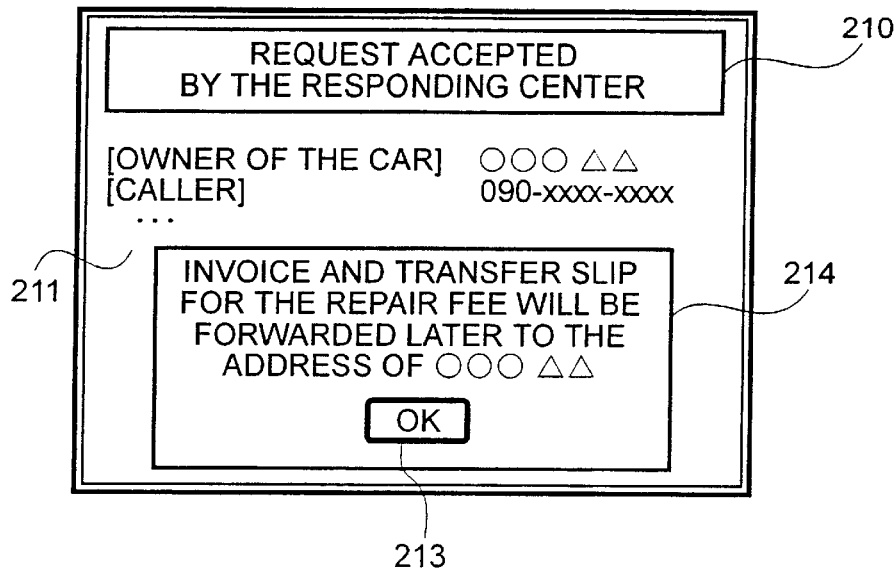

REQUEST ACCEPTED BY THE RESPONDING CENTER — 210

[OWNER OF THE CAR]　○○○ △△
[CALLER]　090-xxxx-xxxx
...  — 211

INVOICE AND TRANSFER SLIP FOR THE REPAIR FEE WILL BE FORWARDED LATER TO THE ADDRESS OF ○○○ △△ — 214

| DATE/ TIME | USER ID | CAR/ POSITION | CONTENTS OF FAILURE INFORMATION | CONTENTS OF REPAIR SERVICES | COST |
|---|---|---|---|---|---|
| x MONTH x DAY | 0901234567 | xxxx | A2 | EXCHANGE OF xxxx | ¥ xxx |
| ... | ... | ... | ... | ... | ... |
| ... | ... | ... | ... | ... | ... |

62

| DATE/ TIME | USER ID | CAR/ POSITION | CONTENTS OF FAILURE INFORMATION | CONTENTS OF REPAIR SERVICES | COST |
|---|---|---|---|---|---|
| x MONTH x DAY | 0901234567 | xxxx | A2 | EXCHANGE OF xxxx | ¥ xxx |
| ... | ... | ... | ... | ... | ... |
| ... | ... | ... | ... | ... | ... |

81

REPAIR AND MAINTENANCE SUPPORT SYSTEM AND A CAR CORRESPONDING TO THE SYSTEM

This application is a continuation of application Ser. No. 10/214,609 filed Aug. 9, 2002 U.S. Pat. No. 6,549,833 which is a continuation of Ser. No. 09/974,832 filed Oct. 12, 2001, now U.S. Pat. No. 6,438,471.

BACKGROUND OF THE INVENTION

1. Field of the Invention

The present invention relates to an automobile system for detecting a vehicle failure and requesting repair or maintenance, and more particularly to a repair and maintenance support system which is optimal for carrying out procedures to request repair without troubling the user at the time of a vehicle failure, and also relates to a navigation apparatus and cellular phone used in such a system.

2. Description of the Related Art

When a car goes out of order while it is being driven on the road, the driver must identify a point of the failure himself, search out the nearest repair shop, make a phone call to request repair, and find the route to the shop and get the vehicle to the shop by driving it himself. Also, if this is a situation where the vehicle cannot run, the repair person is called to the location to transport the vehicle to the shop. In this case, the driver must give his current location to the repair person. In the event of a breakdown in an area with which the driver is not well acquainted, it will take time to transmit this information correctly and a repair person will need extra time to arrive at the destination due to incorrect information. In this way, the driver of the vehicle must perform complicated tasks to make arrangements for the repair work even in a disrupted situation, and will be stuck for long periods of time.

The operation to confirm the condition of the vehicle is difficult for many drivers, but technology for simply performing this operation has been disclosed. For example, the technology indicated in Japanese Patent Application Laid-open No. H09-159581, a navigation apparatus is provided with a function for acquiring a condition of a vehicle. Once the vehicle information is transferred to a remote-control apparatus of the navigation apparatus or a cellular phone, the vehicle information is retransmitted to a personal computer so that it can be examined. When the cellular phone is used, the vehicle information is sent to an automobile maintenance service company through a telephone network and this information is used for the maintenance and inspection of the vehicle.

Even with a conventional art, information necessary for maintenance and inspection performed by a maintenance service company can be transmitted with a simple procedure by the vehicle user. However, in the case of a vehicle breakdown, a series of operations from occurrence of breakdown to repair, such as providing the location of the broken down vehicle and a settlement method, have not been considered. Also, an external processing apparatus such as a personal computer is necessary for management and processing of the vehicle information, but no method for enabling a driver to provide persons concerned with necessary information from within or the vicinity of the broken down vehicle has been disclosed.

SUMMARY OF THE INVENTION

It is an object of the present invention to provide a repair and maintenance support system which enables a driver, at the time of a car breakdown or failure, to take simple steps to correspond just by reporting the breakdown to one reception window, and enables to unify the reception window resulting in easy use.

In order to solve the aforementioned objects, the present invention is a repair and maintenance support system comprising an onboard peripheral apparatus installed on a vehicle and comprising a failure detector, an onboard main controller installed on the vehicle and including a controller for managing vehicle information from the onboard peripheral apparatus, and a response center which can receive information from this onboard main controller through wireless communication; wherein the response center is provided a process controller, a database for storing failures received on the basis of information from the onboard main controller, a database for storing customer-related matters, and a database for storing data relating to failure remedies; and wherein the process controller acquires information relating to failure remedy methods from the database relating to failure remedies established by the car manufacturer, based on failure information from the onboard main controller, and indicate remedies to a shop for carrying out the failure remedies by transmitting information relating to the failure remedy method.

Also, the present invention is a response center which can receive information relating to vehicle failures from the onboard main controller installed on a car and comprising a controller for managing the operating condition of a car through wireless communication; wherein the response center comprises a process controller, a database storing failures received on the basis of information from the onboard main controller, a database storing customer-related matters, and a database for storing data relating to failure remedies; and wherein the process controller acquires information relating to failure remedy methods from the database relating to failure remedies established by the car manufacturer, based on failure information from the onboard main controller, and indicate remedies to a shop for carrying out the failure remedies by transmitting information relating to the failure remedy method.

Furthermore, the present invention is a car comprising a power system; a driving system driven by this power system; a braking system established in this driving system; an onboard peripheral apparatus having failure detector for detecting failures in at least one of the power system, driving system, and braking system; and an onboard main controller having a controller for managing car information from said onboard peripheral apparatus; wherein, when a failure is detected in at least one of said power system, driving system, and braking system, the controller provides a driver with instruction to pull over and stop, while transmitting information relating to the car failure and ID information through wireless communication.

BRIEF DESCRIPTION OF THE DRAWINGS

FIG. 8 shows an example display on the display of the navigation apparatus and cellular phone relating to the first embodiment of the present invention;

FIG. 9 shows the elements constituting the failure reception table relating to the first embodiment of the present invention;

DESCRIPTION OF THE PREFERRED EMBODIMENTS

Preferred embodiments of the present invention are explained below with reference to FIGS. 1 through 16.

Figure 1:
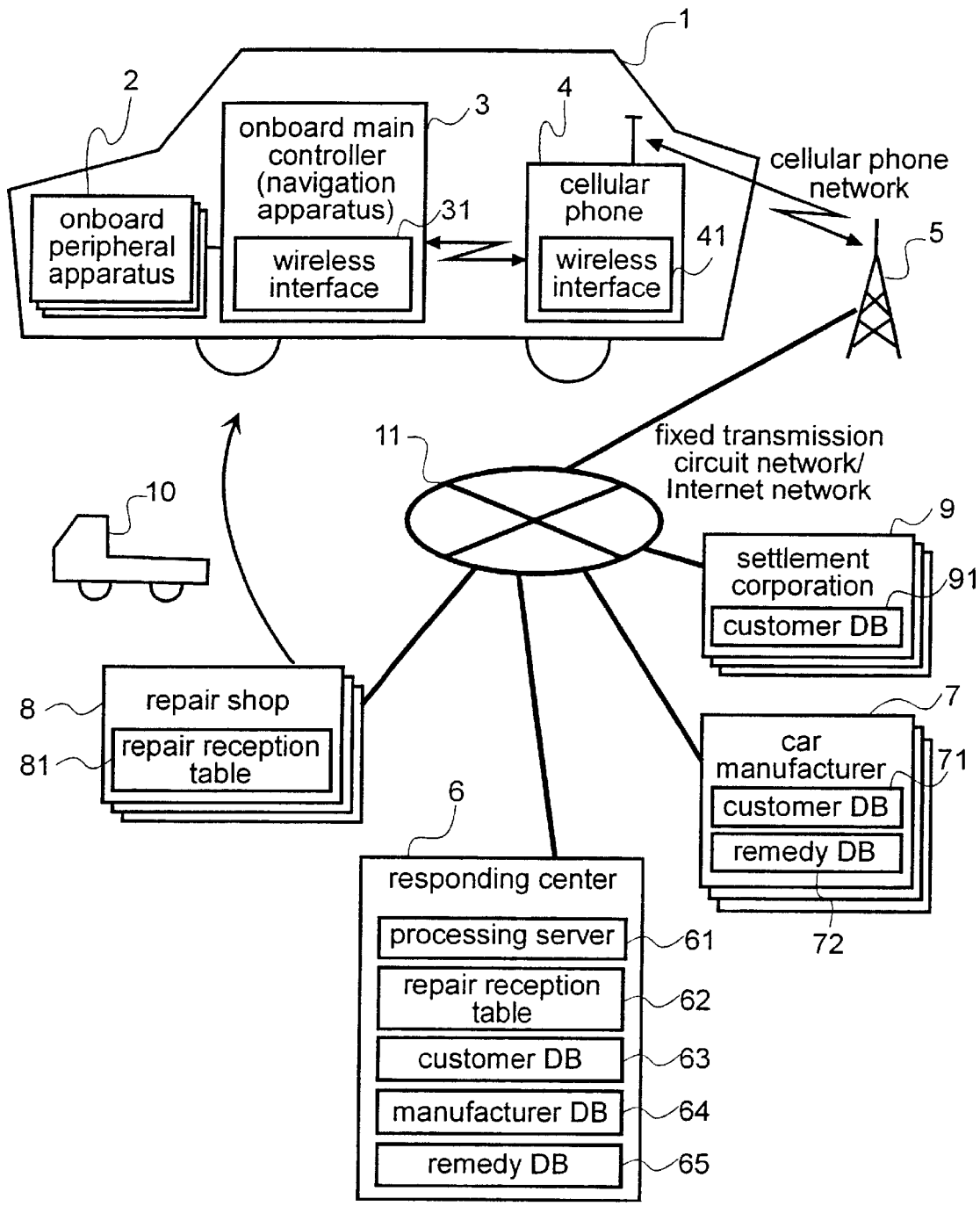
FIG. 1 shows a constitution of a system relating to a first embodiment of the present invention.

The first embodiment of the present invention will be explained with reference to FIGS. 1 through 9. FIG. 1 shows an example of constitution of a repair and maintenance support system relating to the present embodiment. An automobile 1 is provided with: a power system such as an engine or motor; a driving system (power transmission mechanism, wheels, etc.) driven by this power system; and a braking system (brakes) established in this driving system. The automobile 1 is further equipped with an onboard peripheral apparatus 2 for performing control or monitoring of the engine and electronic devices; and a navigation apparatus 3 which is connected with a wireless interface 31 to connect with a cellular phone 4, so as to be able to acquire current position information through GPS (global positioning system). The onboard peripheral apparatus 2 comprises a sensor for performing failure or breakdown detection for at least one of the power system, driving system, and braking system. The power system, driving system, and braking system are basic parts of a car and therefore it is desirable that sensors be established in and failure or breakdown detection performed for all of these. However, failure detection is performed for the engine in the present embodiment. Furthermore, in cases where a computer is used for the control of the engine, different types of sensors for detecting failures and the operating conditions of each part, such as electrical devices, or each functional block are established according to whether the goal is to perform control or monitoring. The navigation apparatus 3 uses GPS and acquires information necessary for specifying the location from artificial satellites, processes that information, and displays the current car position and orientation on a map on the screen.

In the present embodiment, the navigation apparatus 3 has functions of a main onboard controller, and is connected to the onboard peripheral apparatus 2. The controller performs management of the different types of vehicle information such as the speed and travel direction of the vehicle detected by the onboard peripheral apparatus, or of the vehicle operating condition, such as whether each section is working normally. The wireless interface 31 for communicating with the cellular phone for through a wireless connection is installed in the navigation apparatus 3. The same type of wireless interface 41 is installed in the cellular phone 4 and can form a wireless connection with the navigation apparatus 3. In the present embodiment, a second generation low-power data transmission system/wireless LAN system (ARIB STD-T66) developed by the Association of Radio Industries and Businesses (ARIB) is used for this wireless interface, but the wireless interface is not limited to this and may also use the infrared communication which is used commonly in personal computers.

In the present embodiment, the cellular phone 4 belongs to the driver (customer of this system) of an automobile 1 and can communicate through a base station 5 with other telephones or information processing devices connected to a communications network 11 such as a fixed transmission circuit network or the Internet. In the present embodiment, the following are connected to the fixed transmission circuit network: the response center 6 for accepting and arranging car repairs and maintenance, the car manufacturer 7, the repair shop 8, and the settlement corporation 9 for managing the payment of the cellular phone fees and so forth. The repair and maintenance support system is constituted with these. The response center 6 comprises a processing server 61 as a process controller for receiving and arranging car repairs and maintenance, the repair reception table 62 which is the database of failures, the customer database (hereinafter "customer DB") 63, the car manufacturer database (hereinafter "manufacturer DB") 64, and the remedy database (hereinafter "remedy DB") 65. The car manufacturer 7 has a customer DB 71 and remedy DB 72 so as to clarify data such as the vehicle type and model year of the automobile used by the customer and data such as remedying method for a failure or the necessary parts. The repair shop 8 has a repair reception table 81 which is a database for storing received failure information. The settlement corporation 9 has a customer DB 91 as billing information for settling repair fees for the failures.

Figure 2:
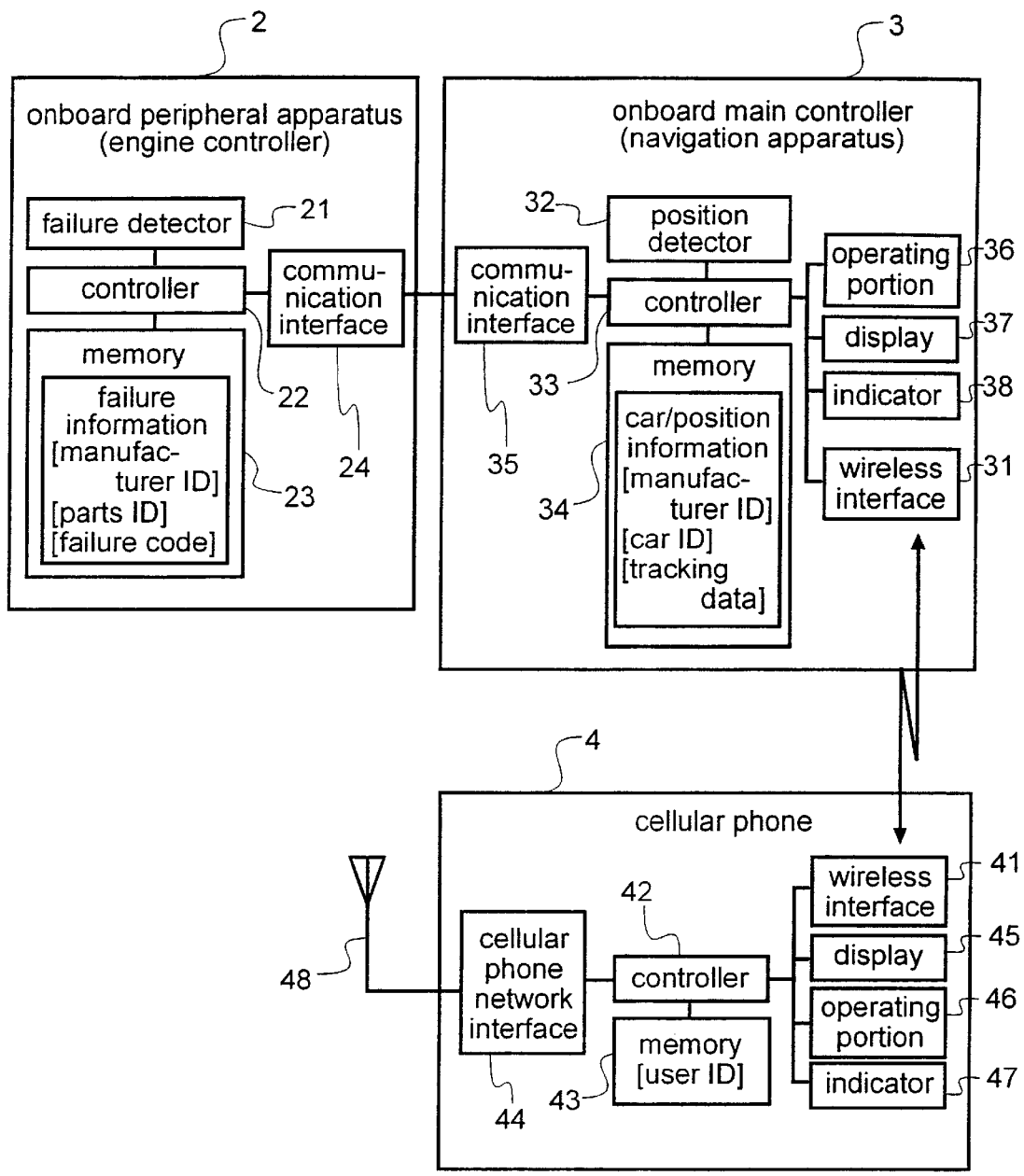
FIG. 2 shows an example of arrangement of constitutional elements within the vehicle relating to a first embodiment the present invention.

The processing steps for each element are explained next. FIG. 2 is a block diagram showing an example of the internal constitution of the onboard peripheral apparatus 2, navigation apparatus 3, and cellular phone 4. In order to monitor the condition of the parts and functional blocks, the following are installed in the onboard peripheral apparatus 2: a failure detector 21, controller 22, memory 23, and communication interface 24. Information such as manufacturer of parts, model name, and failure code are stored in the memory 23. When the failure detector 21 detects a failure, the controller 22 references the memory 23 and outputs information (failure information), such as the manufacturer and model name of the parts which is out of order and the failure code, through the communication interface 24 to the navigation apparatus 3.

The navigation apparatus 3 comprises a position detector 32 carrying out its original function, a controller 33, a display 37, and an operating portion 36, as well as a communication interface 35 for handling the exchange of information with the onboard peripheral apparatus 2, a memory 34 for storing car/position information such as the manufacturer ID, car ID, and tracking data, an indicator 38 for making notification of a failure, and a wireless interface 31 for communicating with the cellular phone 4. The controller 33 has the function of managing the vehicle condition and uses the indicator 38 to notify the driver to pull over and stop in the case of receiving failure information from the onboard peripheral apparatus 23 through the communication interface 35. Also, the controller 33 carries out control so as to transmit car position information to the cellular phone 4 through the wireless interface 31.

In the present embodiment, the cellular phone 4 comprises a wireless interface 41, a controller 42, a display 45, an operating portion 46, an indicator 47, memory 43, and a telephone network interface 44. The display 45 of the cellular phone 4 displays the contents of failure information received. A repair request from the operating portion 46 to the cell phone user is input to the cellular phone 4 and thereby the controller 42 adds the user ID stored in the memory 43 to the failure information, car information, and position information, and makes an automatic call to transmit this information to the response center 6 through the cellular phone network interface 44 and antenna 48.

Figure 3:
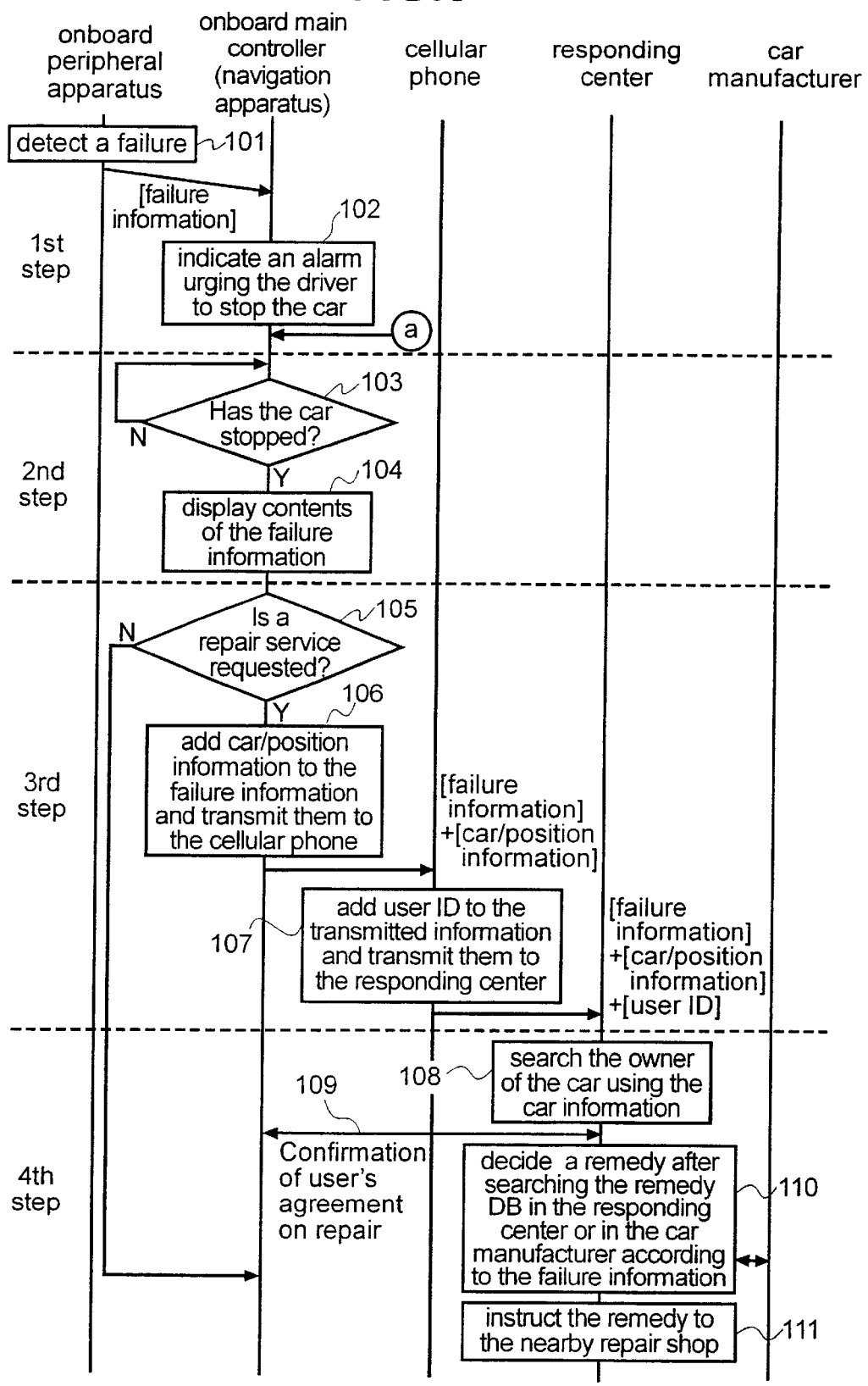
FIG. 3 is a flowchart showing the process flow relating to the first embodiment of the present invention.

The process flow of the elements constituting the repair and maintenance support system relating to the present embodiment is explained with reference to FIG. 3. The processing procedures in the present embodiment are divided into Steps 1 through 3, from when the failure occurs until the driver request repair from the response center 6, and Step 4, from when the response center 6 receives the repair request until the response center 6 sends instructions to the repair shop 8. We will now consider the case where the onboard peripheral apparatus 2 (for example, the engine operating portion) detects a failure.

Figure 4:
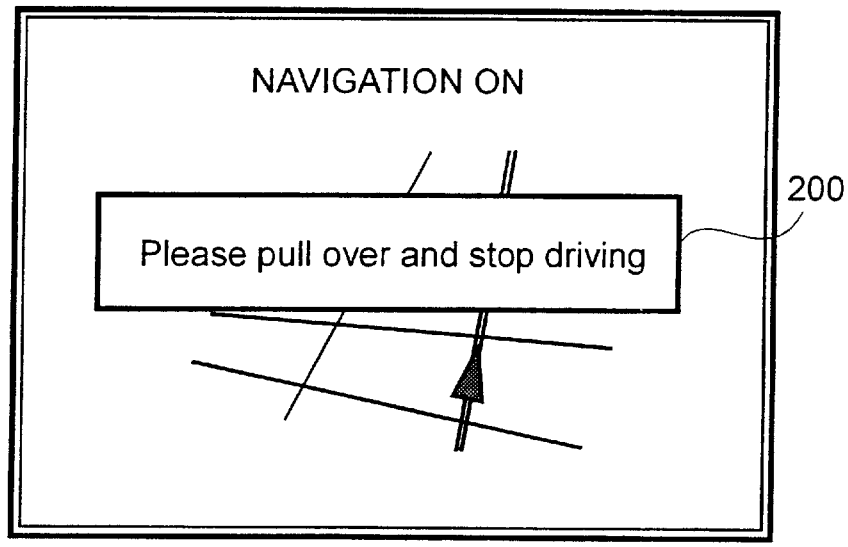
FIG. 4 shows an example display on the display of the navigation apparatus relating to the first embodiment of the present invention.

Step 1: The onboard peripheral apparatus 2 has the function of monitoring the condition of the parts and functional blocks. In the case where the failure detector 21 detects a failure, the controller 22 installed in the onboard peripheral apparatus 2 performs control to reference the memory 23 containing information such as the parts manufacturer and model name, and failure code, and send the pertinent information (failure information) through the communication interface 24 to the navigation apparatus 3 (Step 101). The controller 33 installed in the navigation apparatus 3 has the function of managing the car condition. In the case of receiving failure information from the cellular phone 2 through the communication interface 35, the controller 33 performs control to notify the driver to pull over and stop using the indicator 38 (Step 102). In particular, the power system, driving system, and braking system are basic portions of the car. In the case where a failure is detected in these areas, it is desirable to stop driving for safety reasons. The notification method may use voice or, as shown in FIG. 4, a display on the display 37 of the navigation apparatus 3 telling the driver to stop the vehicle (200), or a combination of voice and display. With the control in this step, a car with a failure can be quickly stopped and safety ensured.

Figure 5:
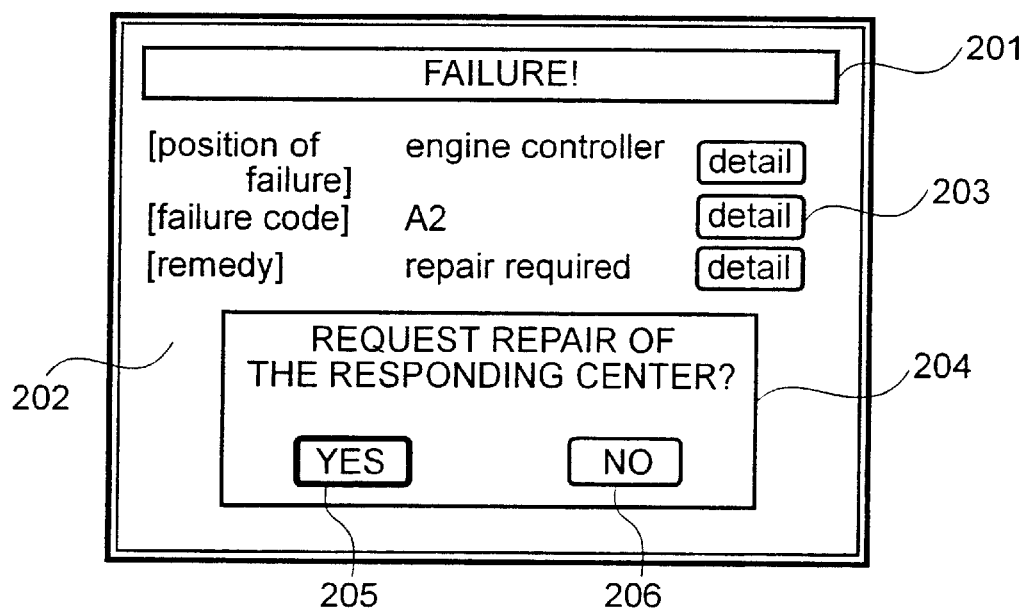
FIG. 5 shows an example display on the display of the navigation apparatus and cellular phone relating to the first embodiment of the present invention.

Step 2: In the case where the controller 33 of the navigation apparatus 3 detects that the car has stopped, the controller 33 exercises control to extract failure details from the failure information transmitted by the onboard peripheral apparatus 2 in Step 1, and to display that information on the display 37 of the navigation apparatus 3 (Steps 103 to 104). At this time, the controller 33 may also exercise control to reference the memory 34 of the navigation apparatus 3 using the failure information transmitted from the onboard peripheral apparatus 2, and display those referenced details on the display 37. FIG. 5 shows an example of this display. Along with the display indicating that a failure has occurred (201), general information on the location of the failure and the remedy thereof (202) is displayed. When the driver wants to know detailed information, the driver presses the "Details" button (203) with the operating portion 36 of the navigation apparatus 3 and causes the detailed information to be displayed. Furthermore, the driver is asked to choose whether to request repair from the response center 6 (204). The driver then makes the choice of whether to request repair by selectively operating the "yes" button (205) or "no" button (206) displayed on the screen.

Figure 6:
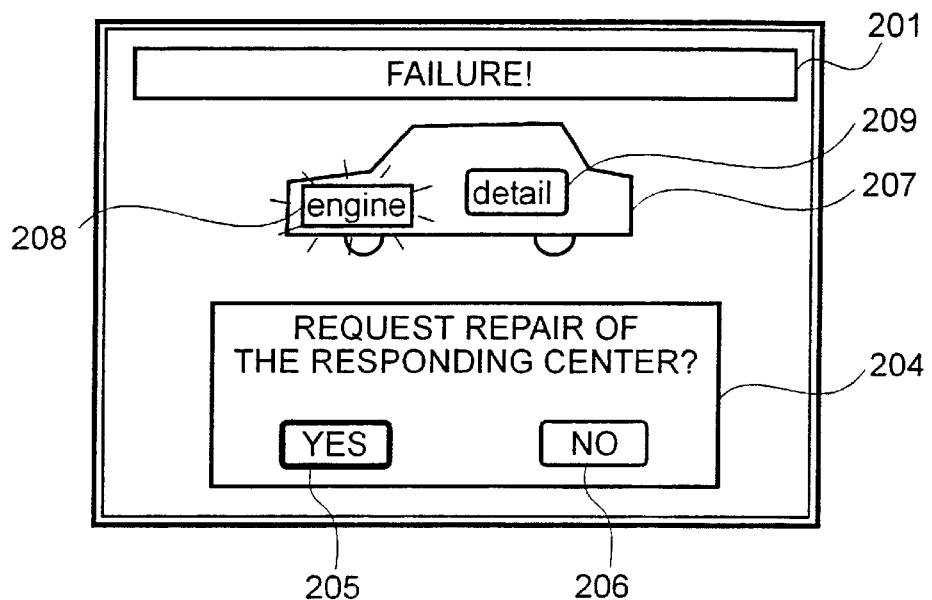
FIG. 6 shows an example display on the display of the navigation apparatus and cellular phone relating to the first embodiment of the present invention.

FIG. 6 is another display example. The failure details can be transmitted to the driver correctly and quickly by displaying the location of the failure with a drawing or icon, which is easy to understand visually (207, 208), along with the display indicating that a failure has occurred (201). When detailed information is necessary, the driver can operate the "Details" button (209) with the operating portion 36 of the navigation apparatus 3 and cause detailed information to be displayed. In response to the question of whether to request repair from the response center 6 (204), the driver selects whether to make a repair request by a selectively operating the "yes" button (205) or "no" button (206) displayed on the screen as in the case in FIG. 5. In addition to confirming the safety of the car and driver, the control in this step can notify the driver precisely of failure details. Also, more detailed information can be provided in response to a request by the driver.

Step 3: By operating the operating portion 36 of the navigation apparatus 3, the driver inputs a repair request to the navigation apparatus 3. In that case, the process advances to the next step. The process terminates if a repair request is not made (Step 105). The controller 33 of the navigation apparatus 3, which is instructed to make a repair request, exercises control so as to transfer car information such as the car manufacturer and car number stored in the memory 34 and car position information attained from the position detector 32, and the failure information sent from the onboard peripheral apparatus 2, through the wireless interface 31 to the cellular phone 4 (Step 106). The cellular phone 4 which received this information uses the controller 42 in the telephone to exercise control so as to add the user ID specifying the user of the cellular phone stored in the memory 43 to the failure information, car information, and position information, automatically call the response center 6, and send this information to the response center 6 (Step 107). The telephone number of the response center 6 may be stored in advance in the memory of the navigation apparatus 3 or cellular phone 4. Also, the user ID of the cellular phone 4 may also be the telephone number of the phone. With the control in this step, the driver completes the procedure for requesting a repair from the response center 6 just by performing operations to make a request with the screen for selecting a repair request.

Step 4: A processing server 61 is established in the response center 6 to perform different types of information processing as shown in FIG. 1. There are also databases such as a customer database 63 for managing customer information, a car manufacturer database 64 for managing information on each car manufacturer, and a remedy database 65 for managing work items and so forth to be performed in the event of each failure. These databases share information with databases at the car manufacturer 7 connected with the response center 6 through a fixed transmission circuit network or the Internet and may also receive information updates from the car manufacturer 7. The processing server 61 in the response center 6 which received the failure information, car information, position information, and user ID of the cellular phone 4 stores this information in a failure reception table 62 established in the center. Next, the processing server 61 references the information in the failure reception table 62 and the databases in the center and identifies the owner of the car (Step 108). For example, the processing server 61 may extract the car manufacturer and car ID from the car information stored in the failure reception table 62, reconcile this with the data held in the car manufacturer database 64, and find the owner of the car. After the owner of the car is specified, the processing server 61 communicates with the navigation apparatus 3 through the cellular phone 4 to confirm agreement to the repair (Step 109). Because the user ID of the cellular phone 4 is already stored in the failure reception table 62, it is possible to specify the contact information.

Figure 7:
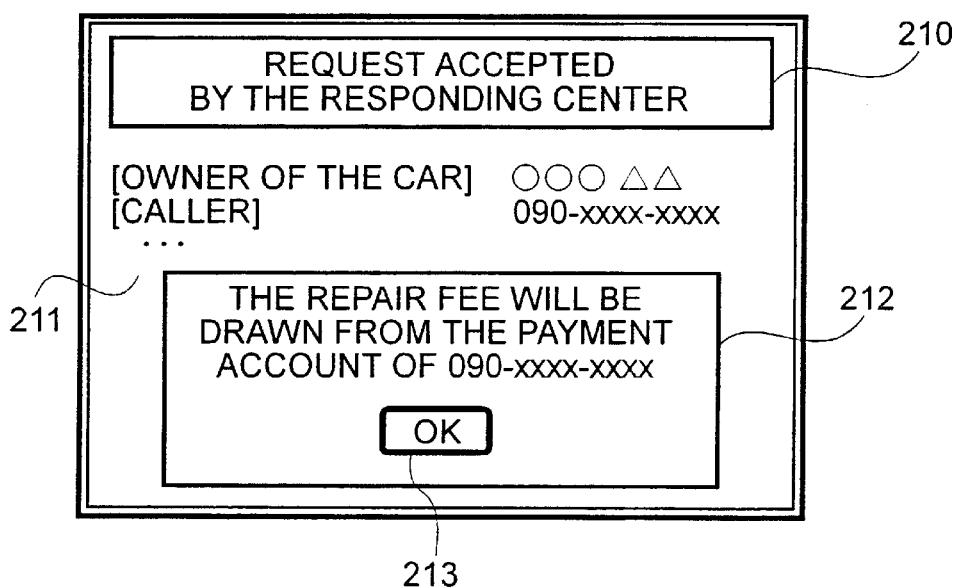
FIG. 7 shows an example display on the display of the navigation apparatus and cellular phone relating to the first embodiment of the present invention.

Also, the cellular phone 4, which received the communication for confirming agreement to the repair from the processing server 61 of the response center 6, may have a program for processing procedures stored in the memory 43 so as to transfer the communication contents to the navigation apparatus 3 automatically. The navigation apparatus 3, which received the confirmation of agreement to the repair, exercises control with the controller 33 to display the contents of the agreement confirmation on the display 37. FIG. 7 shows an example of that display screen. The display 37 indicates that the response center 6 received a repair request (210), and shows the owner of the broken down car specified by the processing server 61 and the user ID of the cellular phone 4 specifying the caller related to the repair request (211). If the user ID of the caller's cellular phone 4 is the cellular phone number, for example, payment of the repair fee may be drawn from the payment account for the cellular phone 4. In this case, advantages are that the settlement procedures are simple for the person requesting the repair, and that confirming the identity of the caller, payment processing, and confirming agreement to the repair are performed with certainty for the response center 6.

The controller 33 of the navigation apparatus 3 exercises control so as to display information to the effect that the repair fee will be withdrawn from the payment account for the cellular phone 4 (212) and the button to confirm agreement to that (213) on the display 37. Also, as shown in FIG. 8, communication to the effect that the transfer slip will be sent the following day (214) and the button to confirm agreement to that (213) may also be displayed for the car owner specified by the processing server 61 of the response center 6. When the user operates the operating portion 36 to input his or her agreement, the controller 33 of the navigation apparatus 3 automatically exercises control to communicate that agreement to the response center 6 through the cellular phone 4. The processing server 61 at the response center 6 which received the communication of the agreement references the information stored in the failure reception table 62 and the databases in the center, determines the method for the remedy, and provides instruction of the remedy to the repair shop 8. At the time when the method for the remedy is specified, a repair shop 8 that can reach the position of the broken down car in the shortest period of time is selected from among either of the repair shops 8 during business hours or those available even outside the business hours.

At this time, as shown in FIG. 9, when the contents of the failure reception table 62 in the response center 6 match the information 81 received by the repair shop 8, the information necessary to make the repair, the location of the broken down car, the caller, and so forth can be understood and the repair work can be carried out quickly and correctly. With the control in this step, the person requesting the repair is provided a feeling of security because the response center 6 communicates that the repair request was received to the person requesting the repair; the agreement of the person requesting the repair and the confirmation of the payment method are completed with a secure and simple procedure for the response center 6; and for the repair shop 8, the information necessary to make the repair, the location of the broken down car, the caller, and so forth can be understood and the repair work can be carried out quickly and correctly.

In the procedures for the aforementioned total of four steps, the processes performed by the navigation apparatus 3 and the cellular phone 4 are stored as programs in the memory installed in each device.

Figure 10:
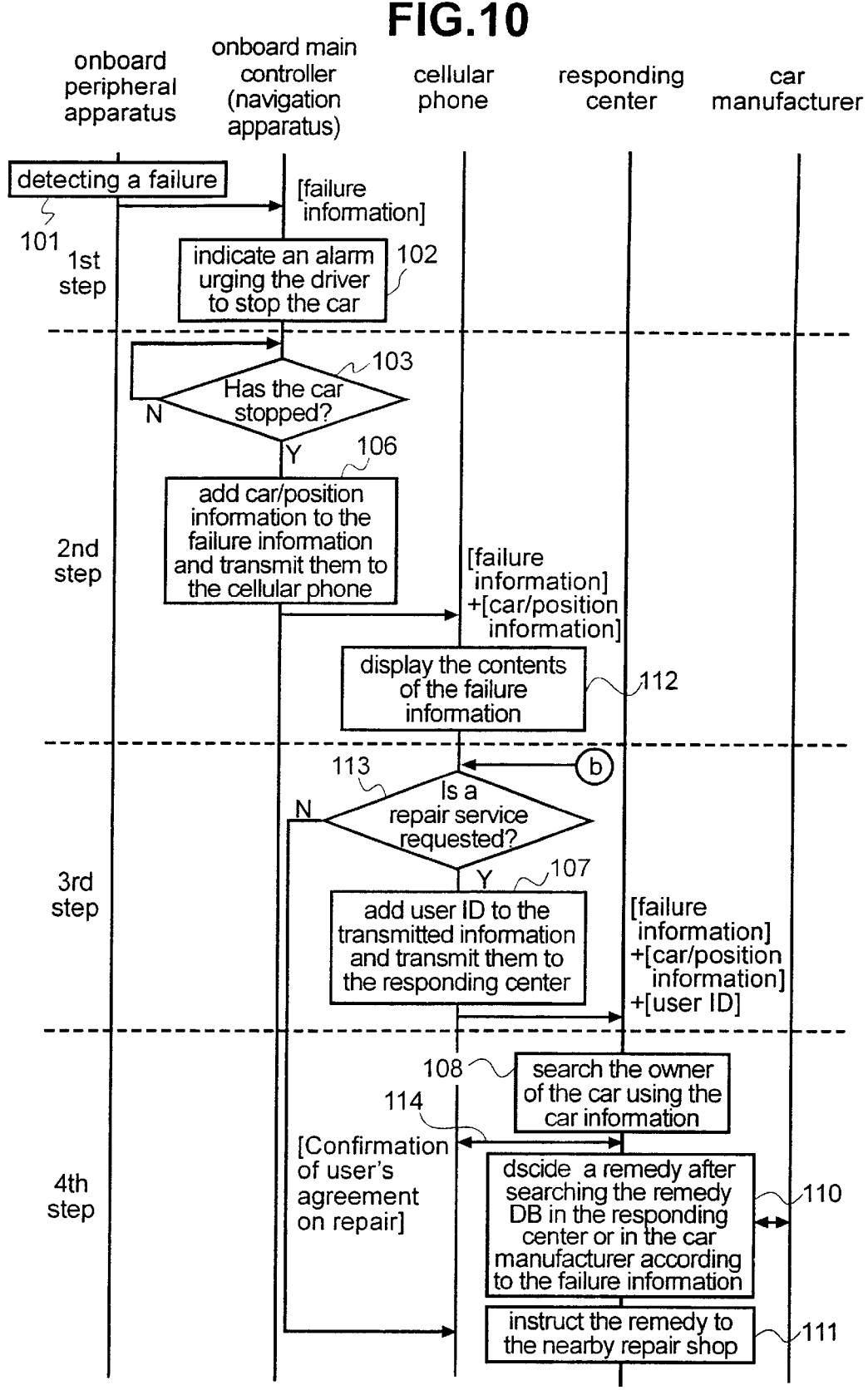
FIG. 10 is a flowchart showing the process flow relating to the second embodiment of the present invention.

FIG. 10 is an example of the process flow of the repair and maintenance support system relating to the second embodiment of the present invention. The present embodiment has the same constitution as the first embodiment, but the failure details are displayed by the cellular phone 4 instead of the navigation apparatus 3.

Step 1: The process is the same as in the first embodiment. The controllers of the navigation apparatus 3 and the cellular phone 4 may exercise control so that the notification to pull over and stop the car is made with the indicator 38 of the cellular phone Step 2: In the case where the controller 33 of the navigation apparatus 3 detects that the vehicle is pulled over and stopped, the controller 33 of the navigation apparatus 3 exercises control so as to transfer car information such as the car manufacturer and car number stored in the memory 34 and car position information attained from the position detector 32, and the failure information sent from the onboard peripheral apparatus 2, through the wireless interface 31 to the cellular phone 4 (Step 106). The cellular phone 4 which received this information uses the controller 42 in the telephone to exercise control so as to display the failure contents based on failure information received on the display 45 (Step 112). The information displayed may be as shown in FIGS. 5 and 6, for example. With the control in this step, convenience is improved in the case of the driver confirming the location of the failure outside the vehicle, because the driver is able to reference failure information even if even outside of the vehicle.

Step 3: The controller 42 of the cellular phone 4 advances to the next process when the user inputs a repair request to the cellular phone 4 by operating the operating portion 46, or ends processing when a repair request is not made (Step 113). The controller 42 of the cellular phone 4 exercises control so as to add the user ID specifying the user of the cellular phone 4 stored in the memory 43 to the failure information, car information, and position information sent from the navigation apparatus 3, automatically call the response center 6, and send this information to the response center 6 (Step 107). With the control in this step, the user of the cellular phone 4 completes the procedure for requesting a repair from the response center 6 just by performing operations to make a request with the screen for selecting a repair request.

Step 4: After the driver is specified, the processing server 61 communicates to confirm agreement to the repair with the cellular phone 4 (Step 114). Because the user ID of the cellular phone 4 is already stored in the failure reception table 62, the caller can be specified. The cellular phone 4 which received the confirmation of agreement to the repair exercises control with the controller 42 to display the contents of the agreement confirmation on the display 45. The contents displayed may be as shown in FIG. 7 or 8, for example. Subsequent processing is the same as in the first embodiment. With the control in this step, the person requesting the repair is provided a feeling of security because the response center 6 communicates that the repair request was received to the person requesting the repair; the agreement of the person requesting the repair and the confirmation of the payment method are completed with a secure and simple procedure for the response center 6; and for the repair shop 8, the information necessary to make the repair, the location of the broken down car, the caller, and so forth can be understood and the repair work can be carried out quickly and correctly.

Figure 11:
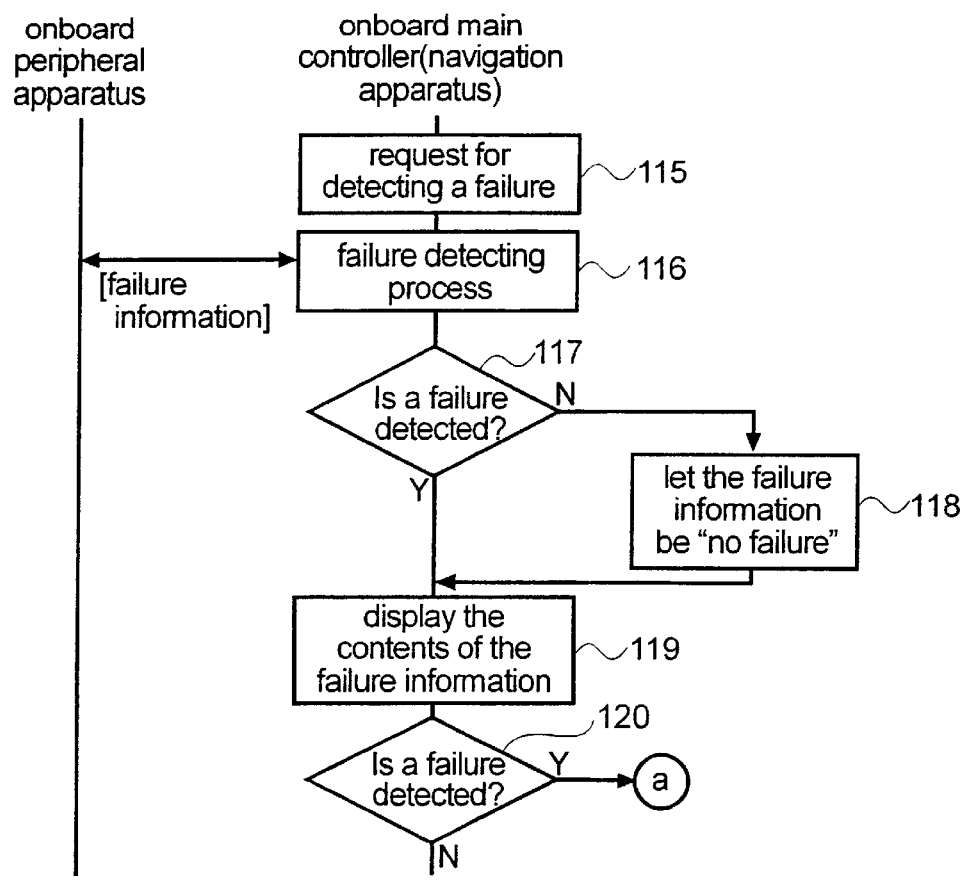
FIG. 11 is a flowchart showing the process flow relating to the third embodiment of the present invention.
Figure 12:
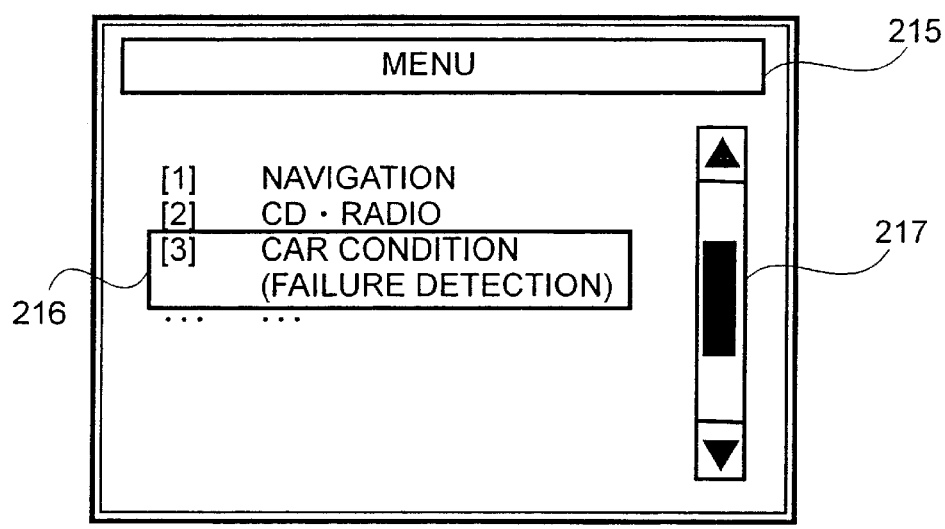
FIG. 12 shows an example display on the display of the navigation apparatus relating to the third embodiment of the present invention.

FIG. 11 is an example of the process flow of the repair and maintenance support system relating to the third embodiment of the present invention. The present embodiment is an example wherein the user of the navigation apparatus 3 decides to carry out failure detection processing by freely performing operations. In order to prompt such operations, a screen as shown in FIG. 12 may be displayed on the display 37 of the navigation apparatus 3. It is indicated that this screen is a menu screen (215), and an item for selecting failure detection (216) is added to a screen for selecting the various functions of the navigation apparatus 3 (in the present embodiment, these are navigation functions and audio functions for listening to CDs or the radio). When a user selects this item using the operating portion 36, an instruction to perform failure detection is output from the controller 33 of the navigation apparatus 3 to each onboard peripheral apparatus 2 (Step 116). Also, because there are many display items, a scroll bar (217) may be displayed and indicate that it is possible to scroll through the screen.

In the case where the controller 33 of the navigation apparatus 3 detects a failure as a result of failure processing, the controller 33 advances to the next process. When there is no failure in any part, it is indicated that failure information=no failure and the controller 33 advances to the next process (Step 118). The controller 33 exercises control to display failure contents based on failure information on the display 37. In the case where failure information=no failure, the result is to give the user a sense of security by displaying that information. Afterwards, in the case where there is a failure in Step 120, the controller 33 advances to (a) in FIG. 3, but exercises control to end the processing when there is no failure. With the present embodiment, the driver can confirm failure detection results on the spot when the driver wants to confirm the condition of the car. Furthermore, in the case where failure is detected the driver can immediately carry out procedures to request repair.

Figure 13:
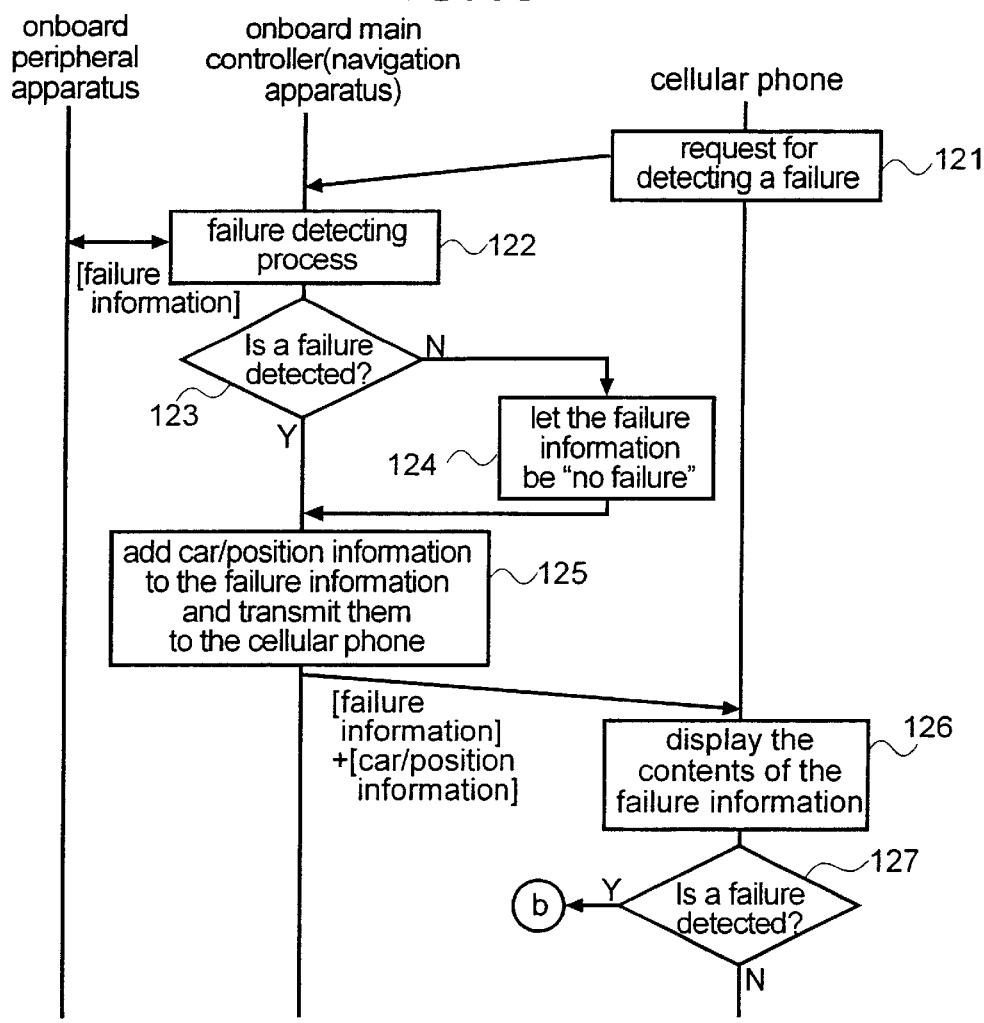
FIG. 13 is a flowchart showing the process flow relating to the fourth embodiment of the present invention.
Figure 14:
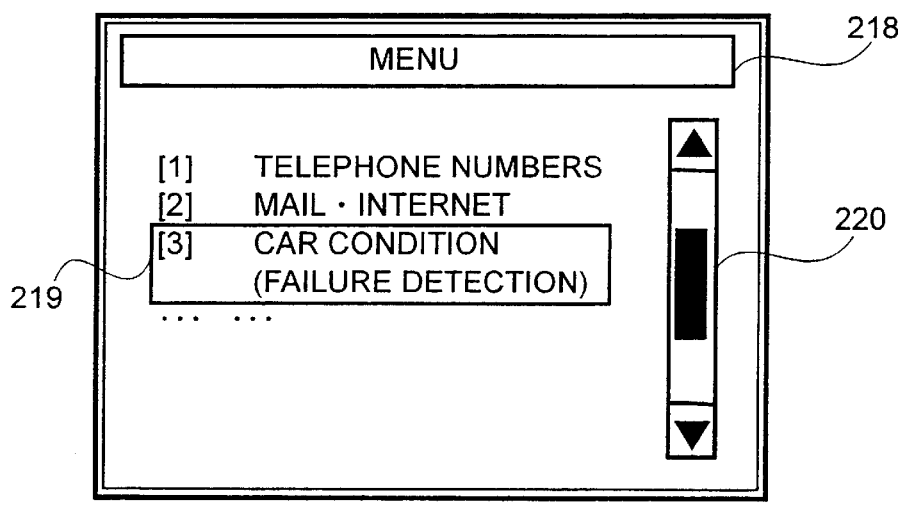
FIG. 14 is a drawing showing an example display on the display of the cellular phone relating to the fourth embodiment of the present invention.

FIG. 13 is a drawing showing an example of the process flow relating to the fourth embodiment of the present invention. The present embodiment is an example wherein the user of the cellular phone 4 decides to carry out failure detection processing by performing predetermined operations. In order to prompt such operations, a screen as shown in FIG. 14 may be displayed on the display 45 of the cellular phone 4. It is indicated that this screen is a menu screen for selecting functions (218). In this case, an item for selecting failure detection (219), in addition to a phone book function and e-mail and Internet functions, is added to the screen. When a user selects this item using the operating portion 46, the controller 42 of the cellular phone 4 exercises control so as to output instructions for failure detection to the navigation apparatus 3 (Step 121). The controller 33 of the navigation apparatus 3 which received the instruction outputs an instruction to perform failure detection to each onboard peripheral apparatus 2 (Step 122). Also, because there are many display items, a scroll bar (220) may be displayed and indicate that it is possible to scroll through the screen.

The presence of a point of failure is determined from the results of Step 122 (Step 123). When the controller 33 of the navigation apparatus 3 detects a failure (Step 123-Y), [the controller] advances to the next process. When there is no point of failure (Step 123-N), the controller 33 advances to the next process with "failure information=no failure" (Step 124). Next, the controller 33 adds the car information and position information to the failure information and sends this information to the cellular phone 4 (Step 125). The controller 42 of the cellular phone 4 which received this information exercises control so as to display failure contents based on the failure information on the display 45 (Step 126). When "failure information=no failure", the user is provided a sense of security with the display of that information. Afterwards, the presence of a failure is determined from the failure information (Step 127). When there is a failure (Step 127-Y), [the controller] advances to (b) in FIG. 10. When there is no failure (Step 127-N), the controller 33 exercises control so as to end the process. With the present embodiment, the user of the cellular phone 4 can confirm failure detection results on the spot when the user wants to confirm the condition of the car. Furthermore, in the case where failure is detected, the driver can immediately carry out procedures to request repair.

Figure 15:
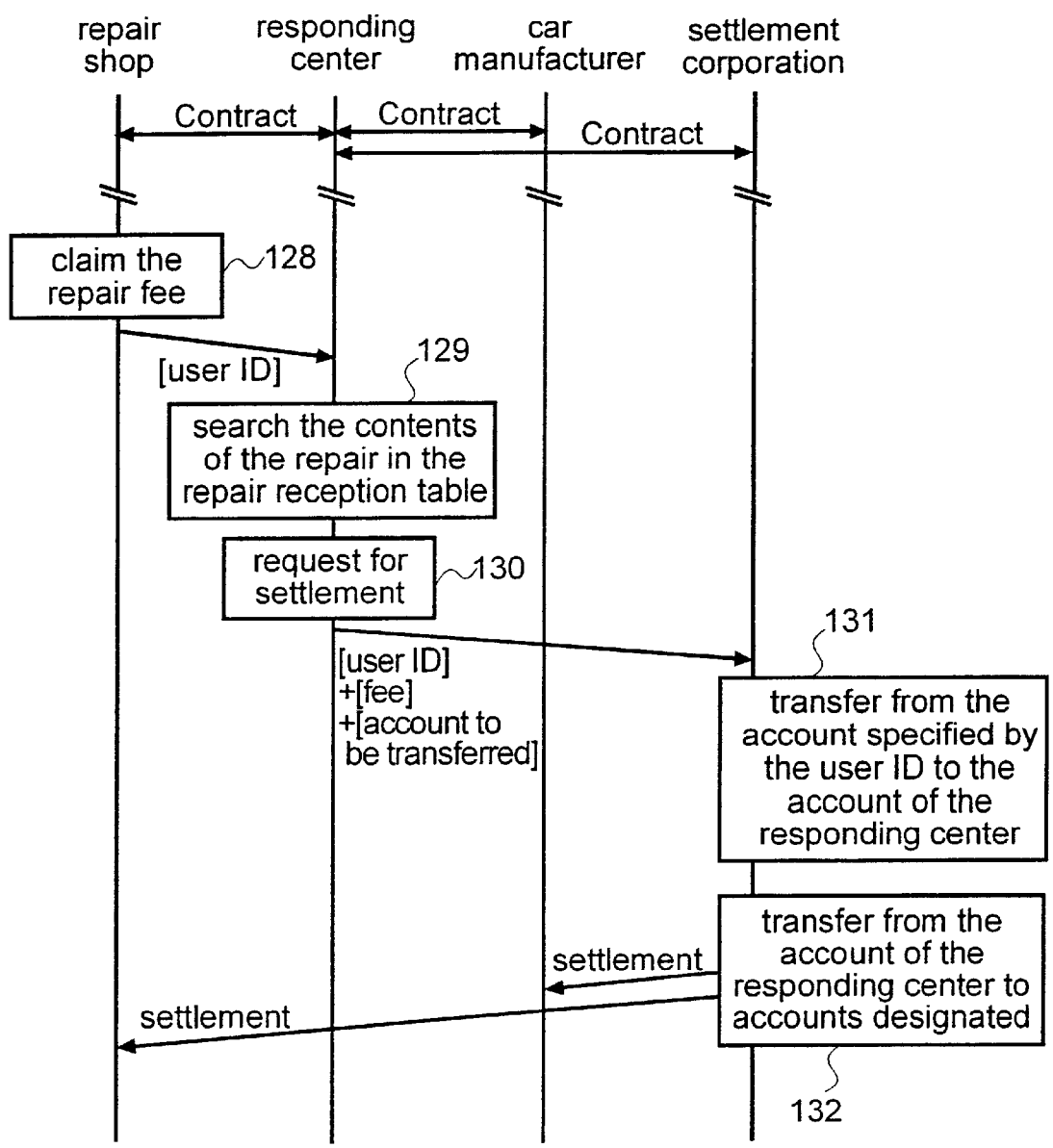
FIG. 15 is a flowchart showing the process flow relating to a fifth embodiment of the present invention.

FIG. 15 is an example of the process flow showing the fifth embodiment of the present invention. The present embodiment realizes automation of settlement procedures for the repair fee. The repair shop 8, the car manufacturer 7 which supplies the parts, and the settlement corporation 9 which administers the payment for the cellular phone 4 specified with the user ID make a contract in advance with the response center 6. First is considered the case wherein the repair shop 8 claims the repair fee. The repair shop 8 finds the user ID of the person requesting the repair from the contents of the failure reception table acquired upon receiving the repair instructions from the response center 6. The repair shop 8 completes the claim of the repair fee by sending this user ID to the response center 6 through the fixed transmission circuit network (Step 128). Next, the response center 6 which received the user ID searches the failure reception table established in the center (Step 129), and completes the request for settlement by extracting the repair details with the user ID received, and sending the user ID, amount claimed, and transfer information to the settlement corporation 9 holding the payment account of the cellular phone specified with the user ID through the fixed transmission network (Step 130). At this time, security is maintained if the information necessary for settlement undergoes encryption.

The settlement corporation 9, which received the user ID, amount claimed, and transfer information, performs processing to transfer the amount claimed from the account of the user ID to the account of the response center 6 specified in the advance contract (Step 131). Afterwards, the settlement processing is completed by transferring the necessary amount from the account of the response center to the repair shop 8 and the car manufacturer 7 on the basis of the transfer information received (Step 132). Because the repair shop 8 claims the repair fee just by sending the user ID of the person requesting the repair through the fixed transmission circuit network to the response center 6, the present embodiment has the effects of saving labor and reducing processing time because the subsequent processing is automated.

Figure 16:
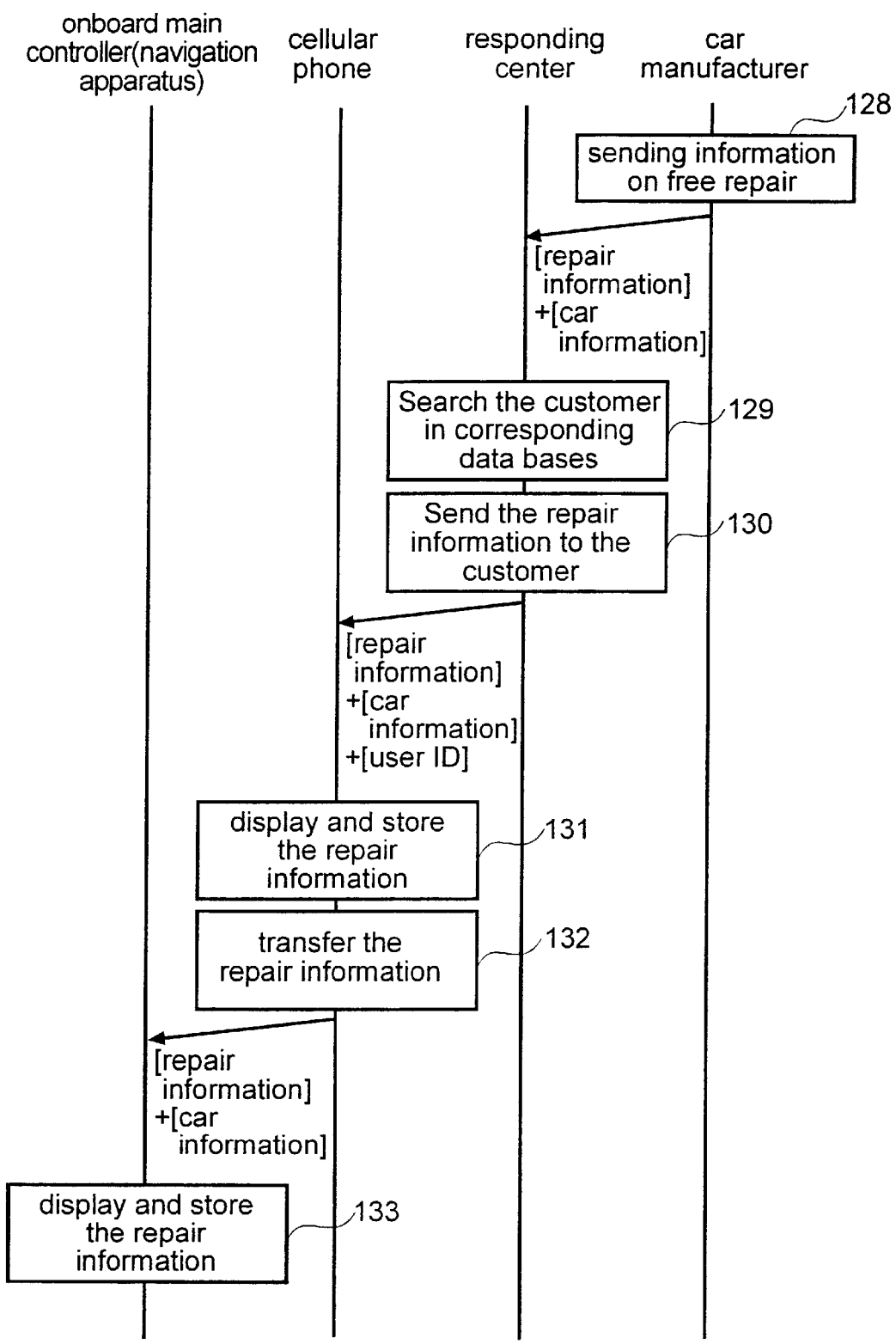
FIG. 16 is a flowchart showing the process flow relating to a sixth embodiment of the present invention.

FIG. 16 is an example of the process flow showing the sixth embodiment of the present invention. The present embodiment is an example of the automation of processing in the case where the car manufacturer 7 distributes information on repairs, or other information relating to the car, to the driver. The car manufacturer 7 completes this processing by sending repair information or information relating to the car to the response center 6 through the fixed transmission circuit network (Step 128). Upon receiving the repair information or information relating to the car, the processing server 61 of the response center 6 searches the database established in the center and finds the user ID for the cellular phone 4 which is related to that car (Step 129). Next, the processing server 61 completes the process by sending repair information, car information, and the user ID to the pertinent cellular phone 4 on the basis of this user ID (Step 130).

Upon receiving the repair information, car information, and user ID, the controller 42 of the cellular phone 4 displays the repair information on the display 45 of the cellular phone 4 or stores the repair information and car information to the memory 43 (Step 131). Next, the controller 42 exercises control so as to transfer the repair information and car information received by the cellular phone 4 to the navigation apparatus 3 (Step 132). The controller 33 of the navigation apparatus 3 exercises control to display the received repair information and car information on the display 37 and store that information in the memory 34 (Step 133). According to the present embodiment, the car manufacturer 7 can distribute information to the cars just by a sending the repair information and car-related information to the response center 6. Also, an advantage for the driver is the appropriate acquisition of repairs or the latest related information regarding the car.

With the aforementioned embodiment, the driver can easily be informed of the failure situation without needing specialized knowledge and does not need to take the trouble to search for the closest repair shop or to explain the failure even when requesting a repair. For this reason, the repair request is completed in a short period of time and anxiety on the part of the driver can be relieved. Also, because the procedure for requesting repair is divided into three stages, the driver is notified of only the necessary information depending on the condition of the car and the repair can be requested safely and securely because the car is definitely stopped before the driver is prompted to engage in the repair request procedures. Furthermore, because the transactions are carried out entirely through the response center, the driver himself is spared the complex operations of making calls to the related parties. Confirming payment is easy because the payment process is a batch process in the response center and the settlement corporation. The payment method may use the transfer account for paying the cellular phone fees, or billing to the address of the driver. The necessary information for this is automatically acquired from the user ID and car information when the response center receives the repair request and therefore no effort is required on the part of the person requesting the repair.

The repair shop 8 can carry out the remedy promptly and correctly based on the correct failure information, car position information, and so forth from the broken down vehicle. Also, there is less effort involved in settlement because the settlement processing is handled by the response center.

The car manufacturer saves effort because the response center is commissioned to handle repair arrangements, the settlement of repair fees, and dealings with the person requesting the repair.

The response center can receive commission fees from the repair shop and car manufacturer because it is commissioned with handling repair arrangements, selling repair fees, and dealing with the person requesting the repair.

In the aforementioned embodiment, failure information output from the onboard main controller is sent to the response center through a cellular phone, but the present invention is not limited to these embodiments. The onboard main controller itself may have a wireless communication function like the cellular phone. Also, vehicle-road communication, such as the one used in ITS (intelligent transportation system), may be used in wireless communication with the response center.

The present invention can provide a repair and maintenance support system which is easy to use, and wherein transactions are integrated, and which is also able to make notification of failure information simply and to simplify the response of the driver when a failure occurs.

What is claimed is:

1. A navigation apparatus comprising:
  a position detector for determining a geographical position using a GPS system;
  a communication apparatus for receiving failure information from a peripheral apparatus;
  a controller connected to said position detector and said communication apparatus;
  a memory connected to said controller for storing data;
  an operating portion connected to said controller for inputting an instruction to said controller;
  an indicator connected to said controller; and
  a wireless interface connected to said controller, being capable of communicating with a response center,
  wherein said controller manages a condition of said peripheral apparatus and uses said indicator to notify a driver to pull over and stop when failure information from said peripheral apparatus is received through said communication apparatus, and
  wherein said controller transmits position information determined by said position detector through said wireless interface.

2. A navigation apparatus, according to claim 1, wherein said controller communicates with a cellular phone through said wireless interface and transmits said position information through said cellular phone.

3. A navigation apparatus, according to claim 2, wherein said memory stores ID information, said cellular phone transmits said ID information with said failure information and position information, and said ID information is the telephone number of said cellular phone.

4. A navigation apparatus, according to claim 2, wherein:
  said cellular phone communicates through a wireless connection with said controller when a predetermined operation is performed; and
  said controller sends said failure information to said cellular phone in response to a command from said cellular phone.

5. A navigation apparatus comprising:
  a position detector for determining a geographical position using a GPS system;
  a communication apparatus for receiving failure information from a peripheral apparatus;
  an indicator for notifying a driver;
  a transmitter for transmitting said failure information to a response center; and
  a controller connected to said position detector, said communication apparatus, said indicator and said transmitter;

wherein said controller manages a condition of said peripheral apparatus and uses said indicator to notify the driver to pull over and stop when failure information from said peripheral apparatus is received by said communication apparatus, and wherein said controller controls said transmitter to transmit position information determined by said position detector.

6. A navigation apparatus, according to claim 5, wherein:

said navigation apparatus comprises a memory connected to said controller for storing ID information, and said controller controls said transmitter to transmit said ID information with said failure information and position information.

7. A navigation apparatus, according to claim 5, wherein:

said indicator comprises a display, and said controller controls said display to display the contents of an agreement confirmation when said navigation apparatus receives confirmation of agreement to repair from said response center.

8. A response center receiving information relating to a car failure from an onboard main controller installed on a vehicle through wireless communication and having a controller for managing the operating situation of the car; wherein:

said response center comprises a process controller, a repair-reception database storing data on failure based on failure information received from said onboard main controller, a customer database storing data on failure remedies;

said process controller is configured to acquire information regarding a particular failure remedy from a second remedy database for storing data on remedies distributed by a vehicle manufacture based on said failure information; and said response center transmits a confirmation of agreement to a repair to said onboard main controller.

9. A response center, according to claim 8, wherein said information relating to a car failure includes.

* * * * *